(12) United States Patent
Seo

(10) Patent No.: US 10,079,478 B2
(45) Date of Patent: Sep. 18, 2018

(54) CONNECTING DEVICE FOR CONTROL TERMINALS IN WITHDRAWABLE TYPE CIRCUIT BREAKER

(71) Applicant: LSIS CO., LTD., Anyang-si, Gyeonggi-do (KR)

(72) Inventor: Jaekwan Seo, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/621,956

(22) Filed: Jun. 13, 2017

(65) Prior Publication Data

US 2018/0123329 A1 May 3, 2018

(30) Foreign Application Priority Data

Nov. 2, 2016 (KR) .......................... 10-2016-0145353

(51) Int. Cl.
| | | |
|---|---|---|
| *H02B 11/12* | (2006.01) | |
| *H02B 11/04* | (2006.01) | |
| *H01H 9/02* | (2006.01) | |
| *H01H 9/22* | (2006.01) | |
| *H02B 11/133* | (2006.01) | |

(52) U.S. Cl.
CPC ........... *H02B 11/04* (2013.01); *H01H 9/0264* (2013.01); *H01H 9/0271* (2013.01); *H01H 9/22* (2013.01); *H02B 11/12* (2013.01); *H02B 11/133* (2013.01)

(58) Field of Classification Search
None
See application file for complete search history.

(56) References Cited

U.S. PATENT DOCUMENTS

| | | | | |
|---|---|---|---|---|
| 4,743,715 A | * | 5/1988 | Gerbert-Gaillard | ........................ H02B 11/133 200/50.23 |
| 5,434,369 A | * | 7/1995 | Tempco | ................. H02B 11/02 200/50.26 |
| 6,160,228 A | * | 12/2000 | Gerbert-Gaillard | ........................ H02B 11/133 200/50.21 |
| 7,124,488 B2 | * | 10/2006 | Ford | ...................... H02B 11/12 29/401.1 |
| 8,383,969 B2 | * | 2/2013 | Mittu | ................... H02B 11/133 200/50.21 |

(Continued)

FOREIGN PATENT DOCUMENTS

| | | |
|---|---|---|
| JP | H08180773 A | 7/1996 |
| JP | 2007166853 | 6/2007 |

(Continued)

OTHER PUBLICATIONS

Search Report for related European Application No. 17162816.7; report dated Sep. 7, 2017 (6 pages).

(Continued)

*Primary Examiner* — Courtney Smith
(74) *Attorney, Agent, or Firm* — K&L Gates LLP

(57) ABSTRACT

The present invention relates to a connecting device for control terminals in a withdrawable type circuit breaker, and more particularly, a connecting device for control terminals in a withdrawable type circuit breaker, capable of automatically connecting or separating control power source terminals for controlling the circuit breaker upon pulling out or inserting a breaker main body.

9 Claims, 11 Drawing Sheets

(56) References Cited

U.S. PATENT DOCUMENTS

| 9,425,590 | B2* | 8/2016 | Jo | ............................ | H01H 9/20 |
| 2012/0261239 | A1* | 10/2012 | Kim | ...................... | H02B 11/24 |
| | | | | | 200/304 |
| 2014/0226262 | A1* | 8/2014 | Salugu | ................. | H02B 11/127 |
| | | | | | 361/679.01 |

FOREIGN PATENT DOCUMENTS

| JP | 2009022159 A | 1/2009 |
| KR | 100860530 | 9/2008 |
| KR | 101068757 | 9/2011 |
| KR | 20160017463 | 2/2016 |

OTHER PUBLICATIONS

Office Action for related Korean Application No. 10-2016-0145353; action dated Nov. 29, 2017 (5 pages).
Korean Intellectual Property Office Search report dated Jul. 18, 2016, 6 pages.

* cited by examiner

CONNECTING DEVICE FOR CONTROL TERMINALS IN WITHDRAWABLE TYPE CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2016-0145353, filed on Nov. 2, 2016, the contents of which are all hereby incorporated by reference herein in its entirety.

BACKGROUND OF THE INVENTION

1. Field of the Invention

This specification relates to a connecting device for control terminals in a withdrawable type circuit breaker, and more particularly, a connecting device for control terminals in a withdrawable type circuit breaker, capable of automatically connecting or separating control power source terminals for controlling the circuit breaker upon pulling out or inserting a breaker main body.

2. Background of the Invention

In general, a circuit breaker is an electrical device that opens or closes a load in a transmission, a substation or an electrical circuit, or breaks a circuit when an accident such as a ground or short circuit occurs. Among these circuit breakers, an air circuit breaker is a circuit breaker using air as an arc-extinguishing medium and is mainly used for low voltage appliances.

The circuit breakers are classified into a fixed type which is fixed in the switchboard or other places, and a withdrawable type in which a breaker main body is installed in a cradle to be pushed in or pulled out of the cradle. The withdrawable type is widely used in terms of advantageous maintenance of the breaker main body.

Meanwhile, the circuit breaker is provided with control terminals for monitoring or controlling the circuit breaker. The control terminals of the withdrawable type circuit breaker are provided in the breaker main body and the cradle. When the breaker main body is pushed into the cradle, the control terminals may be connected to each other and a control signal can be transmitted accordingly.

The withdrawable type circuit breaker is located (disposed), according to relative positions of the breaker main body and the cradle, in three positions (states), namely, a disconnect position (state) in which a control power source is completely disconnected from the cradle, a test position (state) in which the breaker main body is inserted into the cradle by a predetermined distance (depth) such that the control (power source) terminals are connected so as to check a connected state of the circuit breaker, and a connect position (state) in which the breaker main body is completely pushed into the cradle and thus main circuit terminals are connected such that a current flows along a main circuit.

Here, the control terminals are disconnected from each other in the disconnect state and connected to each other in the test state and the connect state. That is, when the breaker main body is moved from the disconnect state to the test state, a cradle-side control terminal module is fixed and a main body-side control terminal module should be moved to be connected to the fixed cradle-side control terminal module. When the breaker main body is moved from the test state to the connect state, the cradle-side control terminal module and the main body-side control terminal module should be moved together with the breaker main body while being connected to each other. Also, a disconnection process is reverse to the connection process.

Hereinafter, description will be given of a prior art (Korean Patent Application No. 10-2016-0017463 'Connecting device for control terminals in withdrawable air circuit breaker' that the inventor of the present application has applied as an invention proposed for allowing connection and movement of the control terminals to be automatically executed according to a moved position of a breaker main body.

FIGS. 1 to 3 illustrate operation views of the connecting device for the control terminals in the withdrawable air circuit breaker according to the prior art, which illustrate a disconnect state, a test state and a connect state, respectively.

In the prior art, a connecting device for control terminals in a withdrawable air circuit breaker includes a fixed control terminal module 230 installed on the breaker main body 200, a movable control terminal module 130 movably installed on the cradle 100, and a locking device 400. The locking device 400 operates in cooperation with a transfer unit.

The transfer unit includes a screw shaft 310 rotated by a handle (not illustrated), a rack 320 moving back and forth in response to the rotation of the screw shaft 310, a pinion 330 engaged with the rack 320, a link assembly 340 coupled to the pinion 330, and a cam 350 coupled to the link assembly 340.

When the breaker main body 200 is pushed into the cradle 100 and moves from the disconnect state to the test state (FIG. 1→FIG. 2), the rotation of the screw shaft 310 is transferred to the rack 320, the pinion 330, the link assembly 340 and the cam 350 and thus the cam 350 is rotated in a counterclockwise direction. The locking device 400 is restrained at a head portion of the cam 350 so as to lock the movable control terminal module 130. In this instance, a locking part 413 formed at the upper end of the locking device 400 is in a state of restraining a support member 132 of the movable control terminal module 130. Accordingly, the fixed control terminal module 230 of the breaker main body 200 is inserted into the movable control terminal module 130 and connected to a control circuit.

When the breaker main body 200 is continuously inserted into the cradle 100 from the test state to the connect state (FIG. 2→FIG. 3), the cam 350 is further rotated such that the head portion of the cam 350 pulls down the locking device 400. Accordingly, the locked movable control terminal module 130 is released, and thus the control terminal modules 130 and 230 are moved up to the connect state while being connected to each other.

However, in the prior art, since the locking device 400 operates in cooperation with the transfer unit, it is dependent on the transfer unit. That is, the locking device 400 may be likely to be malfunctioned due to an error of the transfer unit, and a mechanism that operates in cooperation with the transfer unit should be designed. As a result, the construction of the locking device 400 becomes complicated and instability and inaccuracy may occur in the operation of the locking device 400. Accordingly, there is a need for a locking device that independently operates without the cooperation with the transfer unit.

SUMMARY OF THE INVENTION

Therefore, to solve the aforementioned problems and other drawbacks, an aspect of the detailed description is to provide a connecting device for control terminals in a withdrawable circuit breaker, capable of connecting or disconnecting control power terminals for controlling the circuit breaker in an independent manner, without cooperation with a transfer unit, when a breaker main body is pushed in or pulled out.

To achieve these and other advantages and in accordance with the purpose of this specification, as embodied and broadly described herein, there is provided a connecting device for control terminals in a withdrawable type circuit breaker, the device including a cradle-side control terminal module horizontally installed on a cradle to be slidable thereon, a main body-side control terminal module provided on a breaker main body to be contactable with or separated from the cradle-side control terminal module, and a blocking unit restricting or allowing a motion of the cradle-side control terminal module, wherein the blocking unit may include a latch release plate fixed to a side surface of the breaker main body and provided with a contact surface on one surface thereof, the contact surface having a flat portion and an inclined portion, and a latch rotatably disposed on a side surface of the cradle and performing a sliding or rotational motion along the contact surface.

Here, the latch may include a restricting portion formed on one end thereof and brought into contact with the cradle-side control terminal module to restrict a movement of the cradle-side control terminal module, and a contact portion formed on another end thereof and moving along an upper surface of the contact surface.

The contact portion may be formed as a protrusion in a cylindrical shape, and the cradle may be provided with a latch operation hole in which the contact portion is inserted for movement.

The contact surface may include a first flat portion with which the contact portion is brought into contact while the breaker main body moves from a disconnect state to a test state, a first inclined portion with which the contact portion is brought into contact in the test state, and a second flat portion with which the contact portion is brought into contact while the breaker main body moves from the test state to a connect state.

Also, the device may further include a second inclined portion with which the contact portion is brought into contact in the connect state, and a third flat portion formed on a portion symmetrical to the first flat portion based on the second flat portion.

The first flat portion and the second flat portion may be formed at different height from each other.

The latch release plate may include a body portion installed at a predetermined distance from a side surface of the breaker main body and having the contact surface on one surface thereof, and coupling portions bent from both ends of the body portion and coupled to the side surface of the breaker main body.

The latch release plate may be integrally formed with a transport handle of the breaker main body.

The device may further include an elastic member having one end fixed to one side of the latch and another end fixed to a part of the cradle.

The elastic member may be a compression spring or a tension spring.

In a connecting device for control terminals in a withdrawable type circuit breaker according to one embodiment of the present invention, a cradle-side control terminal may be maintained in a locked state while a breaker main body moves from a disconnect position to a test position. This may result in a smooth connection of the control terminals. Also, the locked state of the cradle-side control terminal can be released while the breaker main body moves from the test position to a connect position. This may allow the control terminals in a connected state to each other to be moved into the cradle together.

Also, since the connecting device for the control terminals independently operates without cooperation with a transfer unit, a configuration of the device can be simplified and accuracy and stability of a connecting operation thereof can be improved. In addition, components of the device can be simplified.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given of preferred configurations, with reference to the accompanying drawings, which is to explain in detail enough that those skilled in the art to which the present invention belongs can easily practice the invention. It should not be construed to limit the technical scope and spirits of the present invention.

Figure 1:
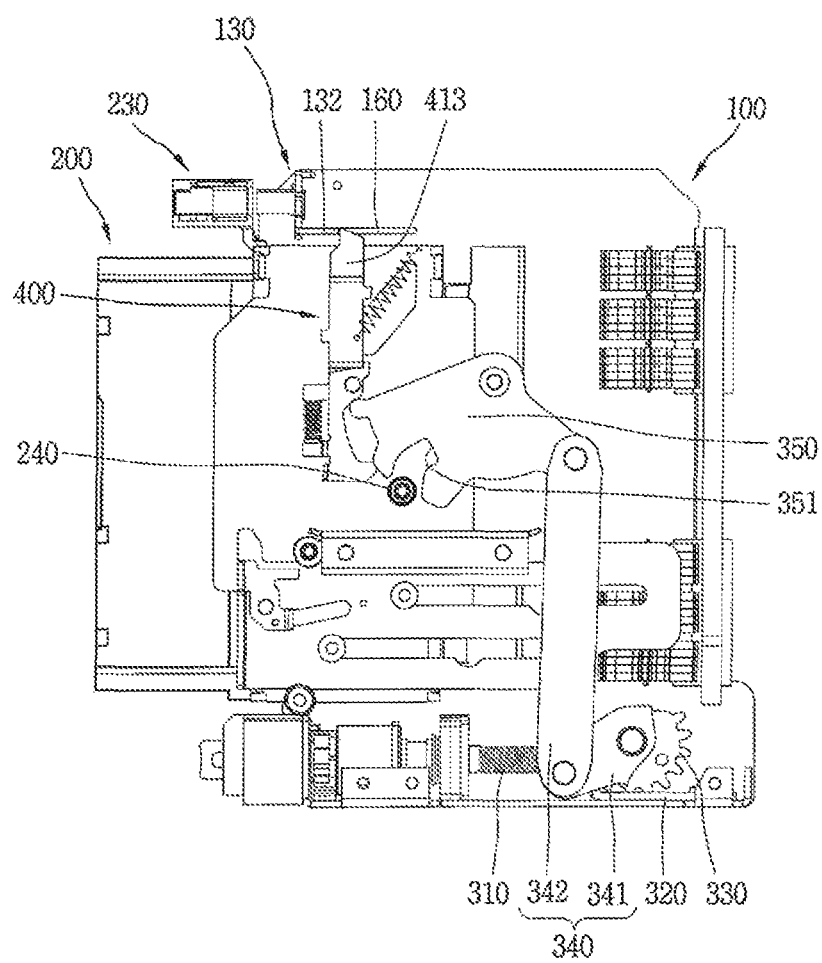
FIGS. 1 to 3 are operation views of a connecting device for control terminals in a withdrawable air circuit breaker according to the related art, which illustrate a disconnect state, a test state and a connect state, respectively.
Figure 2:
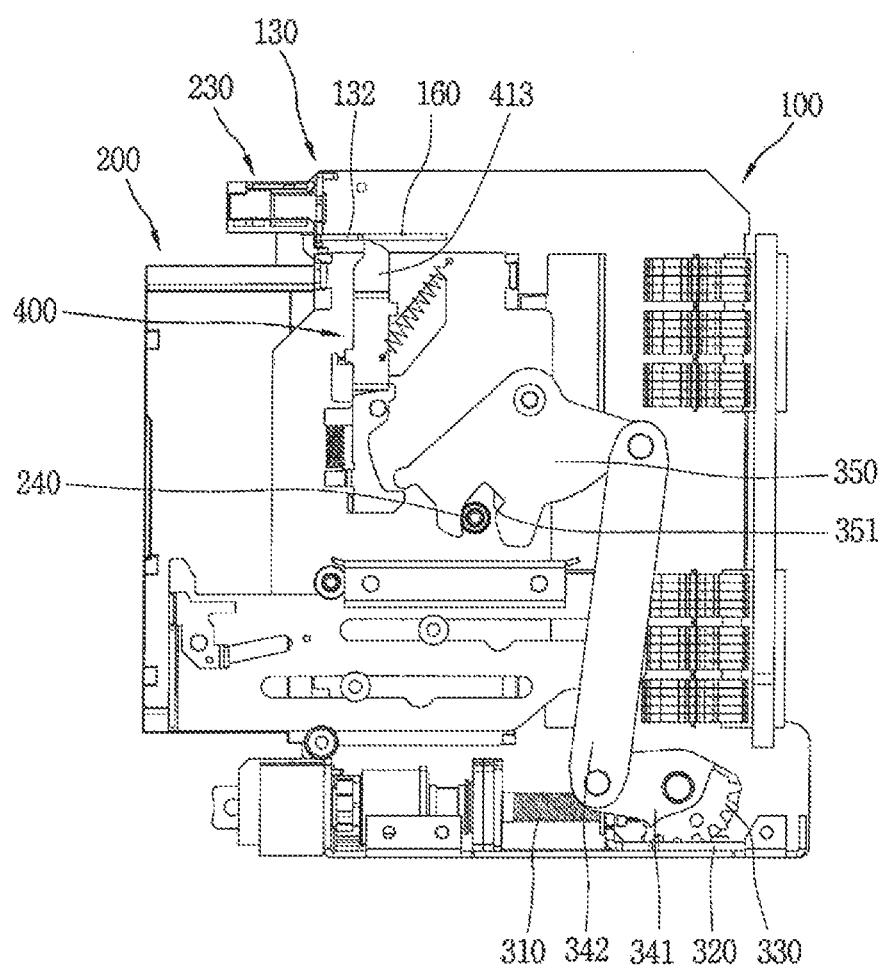
Figure 3:
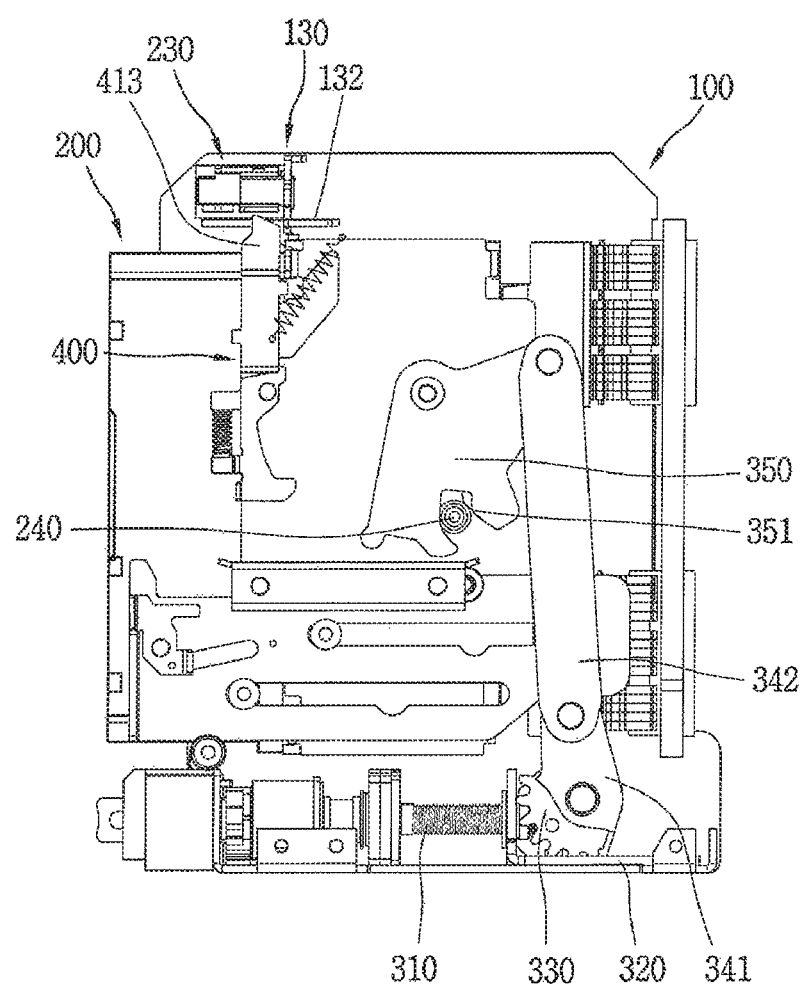
Figure 4:
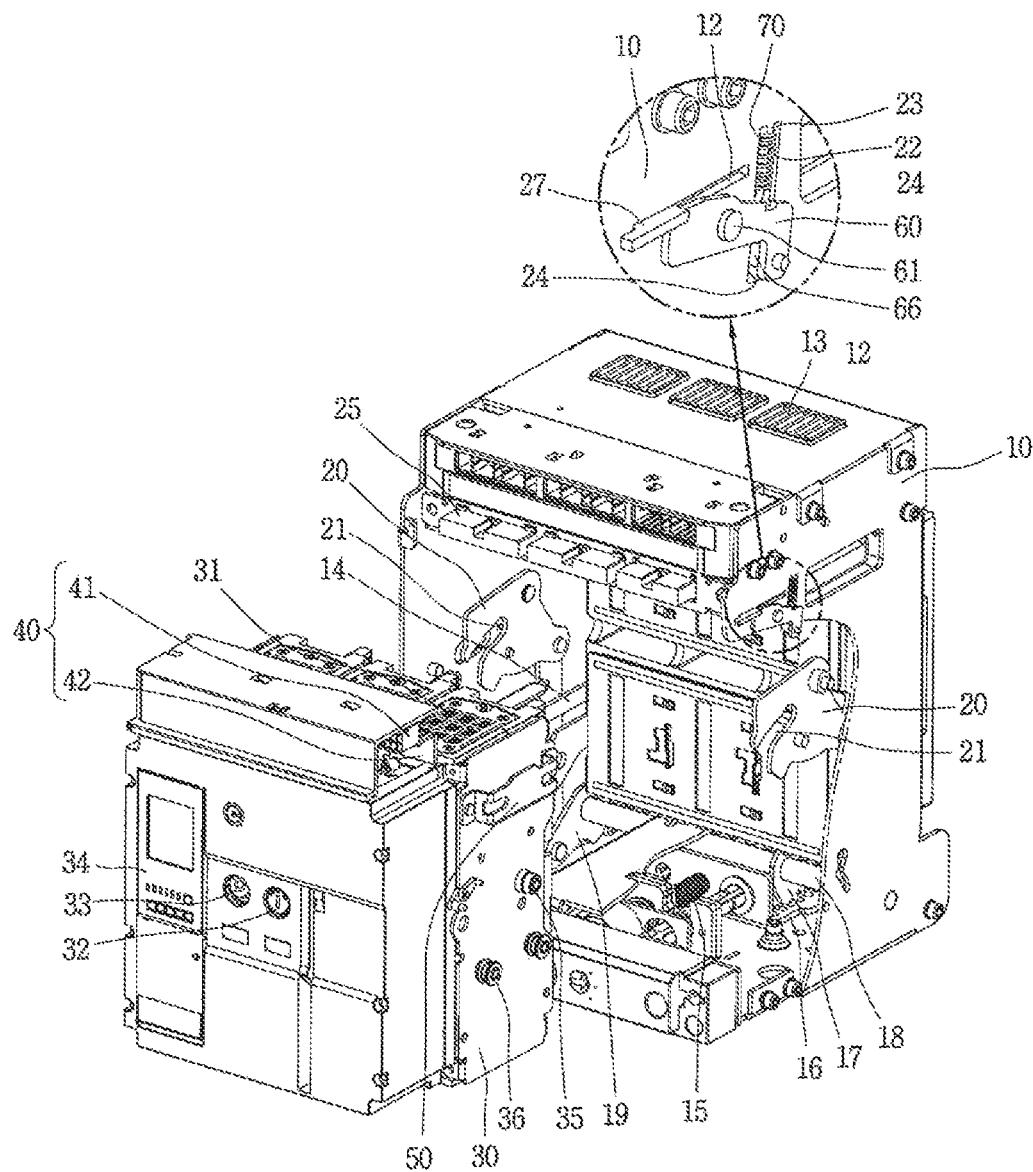
FIG. 4 is a perspective view of a connecting device for control terminals in a withdrawable circuit breaker in accordance with one embodiment of the present invention.
Figure 5:
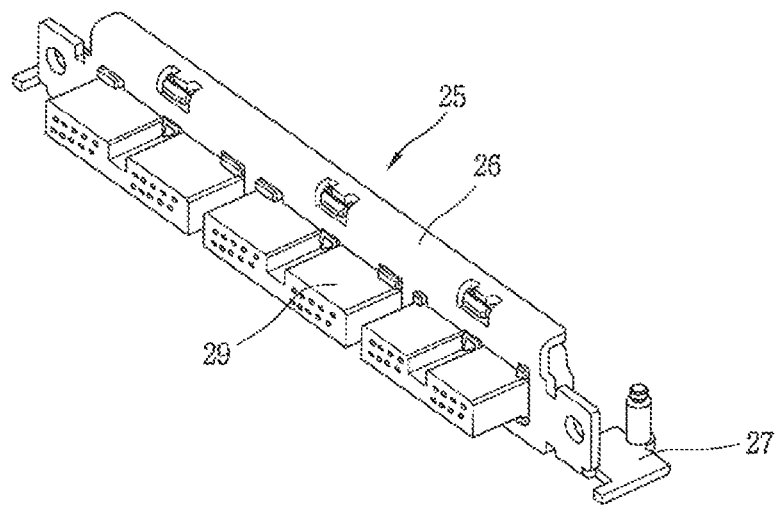
FIGS. 5 to 7 are perspective views of a cradle-side control terminal module, a latch release plate, and a latch which are employed in a connecting device for control terminals in a withdrawable circuit breaker in accordance with one embodiment of the present invention.
Figure 6A:
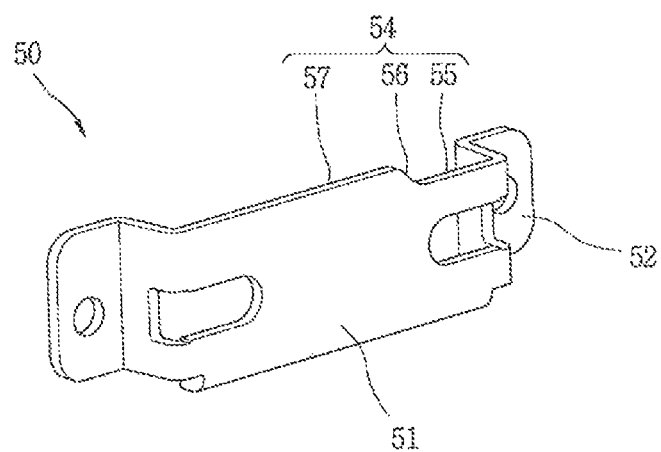
Figure 6B:
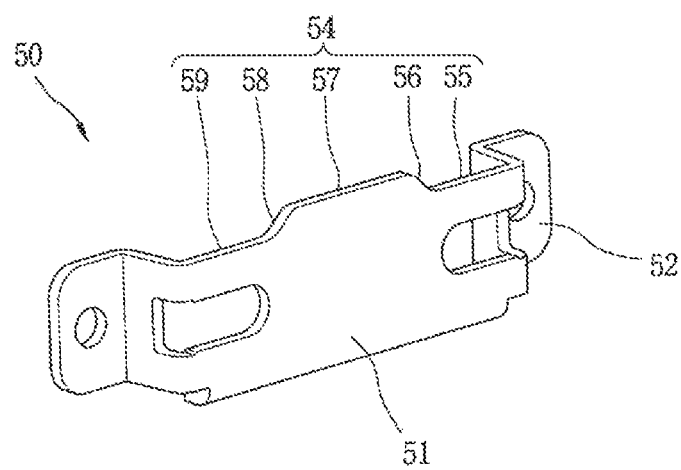
Figure 7:
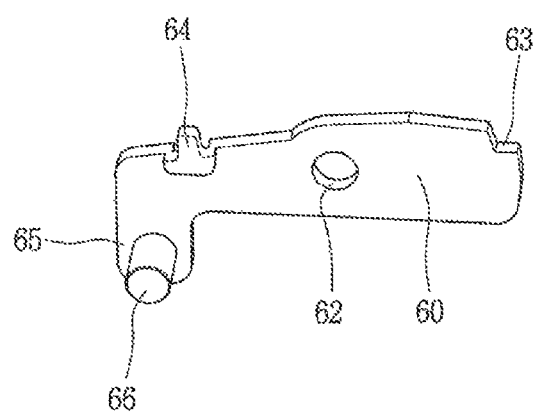
Figure 8:
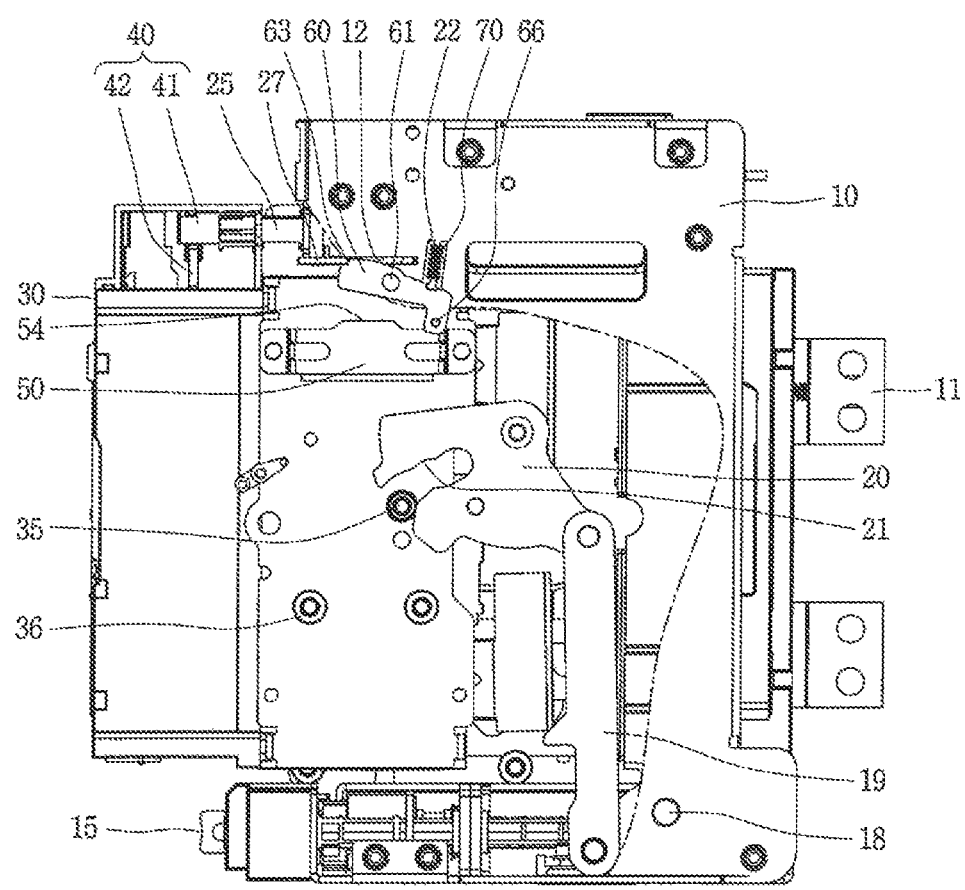
FIGS. 8 to 10 are operation views of a connecting device for control terminals in a withdrawable circuit breaker in accordance with one embodiment of the present invention, which illustrate a disconnect state, a test state and a connect state, respectively.
Figure 9:
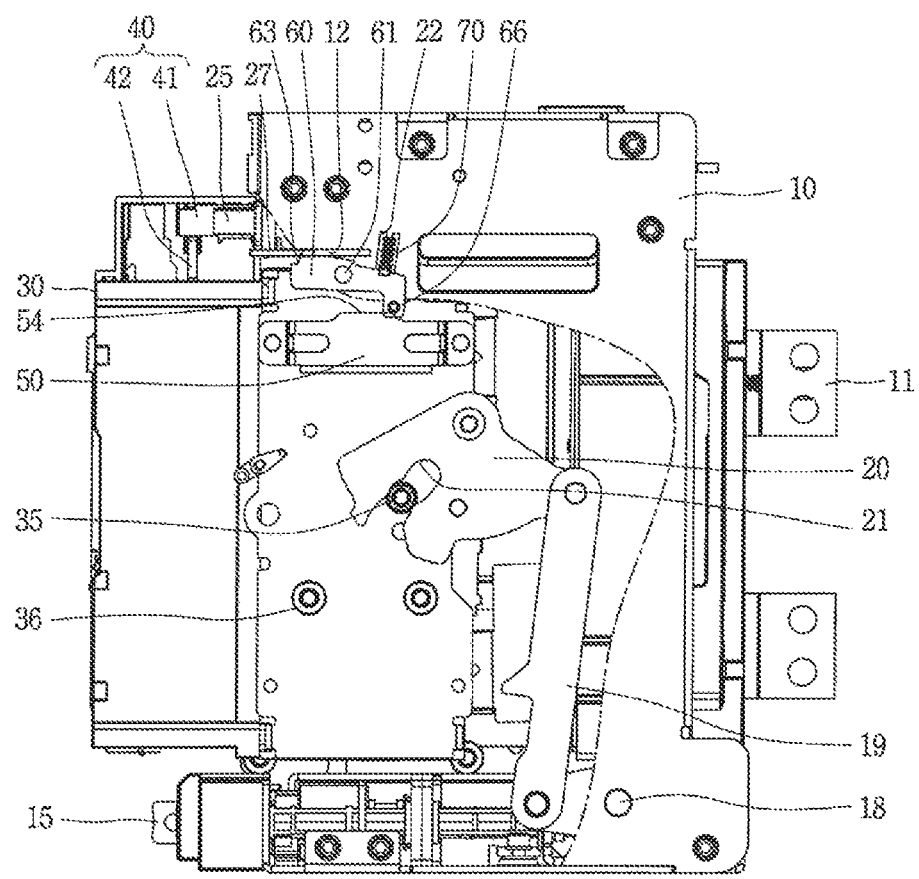
Figure 10:
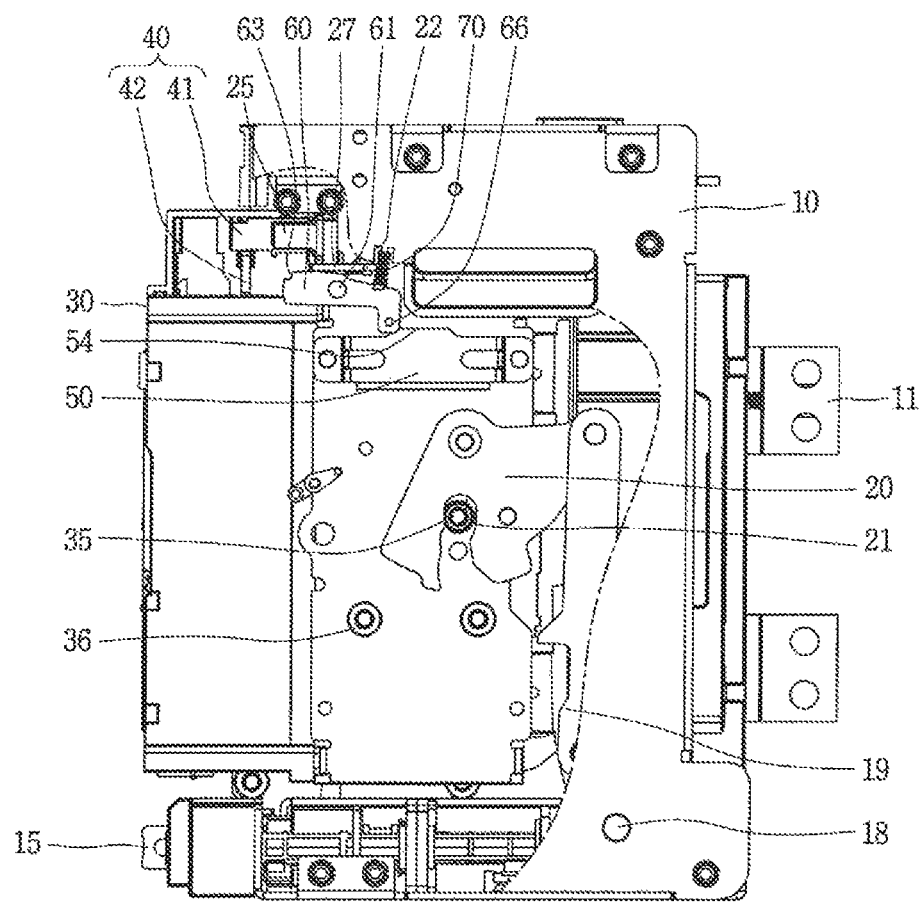

FIG. 4 is a perspective view of a connecting device for control terminals in a withdrawable type circuit breaker according to an embodiment of the present invention, and FIGS. 5 to 7 are perspective views of a cradle-side control terminal module, a latch release plate, and a latch which are employed in a connecting device for control terminals in a withdrawable circuit breaker in accordance with one embodiment of the present invention. Also, FIGS. 8 to 10 are operation views of a connecting device for control terminals in a withdrawable circuit breaker in accordance with one embodiment of the present invention, which illustrate a disconnect state, a test state and a connect state, respectively. Hereinafter, each of the embodiments of the present invention will be described in detail with reference to the drawings.

A connecting device for control terminals in a withdrawable type circuit breaker according to an embodiment of the present invention includes a cradle-side control terminal module 25 horizontally installed on the cradle 10 to be slidable thereon, a main body-side control terminal module 40 provided on a breaker main body 30 to be connectable to or separated from the cradle-side control terminal module 25, and a locking unit that restricts or allows (locks or unlocks) a motion of the cradle-side control terminal module 25. The locking unit includes a latch release plate 50 fixed to a side surface of the breaker main body 30 and having a contact surface 54 formed on one surface thereof and provided with a flat portion and an inclined portion, and a latch 60 rotatably installed on a side surface of the cradle 10 and executing a sliding motion or a rotational motion along the contact surface 54.

FIG. 4 is a perspective view of the cradle 10 according to the embodiment of the present invention. A side portion is partially cut off to facilitate understanding of an internal structure.

The cradle 10 may be formed in a box-like shape with its front surface open to accommodate the breaker main body 30. Slits 12 for installing the cradle-side control terminal module 25 to be slidable therealong are formed at both side surfaces of the cradle 10. Each of the slits 12 is formed horizontally in a shape of a straight line. A spring hole 22 is formed at the rear of each slit 12 to install an elastic member 70. The spring hole 22 may be formed to be inclined at a predetermined angle with respect to a perpendicular direction. A fixing protrusion 23 for fixing an upper end portion of the elastic member 70 may be formed on an upper end portion of the spring hole 22. A latch operation hole 24 in which a part of the latch 60 is operably inserted is formed below the spring hole 22. The latch operation hole 24 may be formed in an arcuate shape.

Cradle terminals 11 for connecting the cradle to a power source side circuit and a load side circuit are provided on a rear surface of the cradle 10 (FIG. 8). Discharge holes 13 for discharging gas coming out of an arc chute 31 of the breaker main body 30 is formed through an upper portion of the cradle 10. Rails 14 are provided on inner side surfaces of the cradle 10 to receive the breaker main body 30 such that the breaker main body 30 is drawn out of or inserted into the cradle 10. A transfer unit by which the breaker main body 30 mounted on the rails 14 is drawn out of or inserted into the cradle 10 is provided on side and lower portions of the cradle 10.

Here, the transfer unit includes a screw shaft 15 provided on a lower portion of the cradle 10 in back and forth directions, and receiving a rotational force by a manual handle (not illustrated) or a gearing (not illustrated), racks 16 installed to be movable in back and forth directions of the cradle 10 in response to the rotation of the screw shaft 15, a rotating shaft 18 rotated by pinions 17 engaged with the racks 16, link assemblies 18 provided at both end portions of the rotating shaft 18, cams 20 mounted on inner side surfaces of the cradle 10 and rotated by forces from the link assemblies 19, and cam followers 35 provided on both side surfaces of the breaker main body 30 to be coupled to cam slots 21 formed at the respective cams 20.

The cam slot 21 of each cam 20 serves to push or pull the cam follower 35 inserted into the cam slot 21 when the cam 20 rotates, such that the cam follower 35 moves horizontally. Here, the cam follower 35 may be configured as a roller for reducing friction.

The breaker main body 30 is provided therein with a switch mechanism, a contact portion, and an arc-extinguishing portion. The arc chute 31 as the arc extinguishing portion for extinguishing an arc is exposed at an upper portion of the breaker main body 30. The main body-side control terminal module 40, which can be coupled to the cradle-side control terminal module 25, is installed on the upper portion of the breaker main body 30. An ON button 32 for a closing operation and an OFF button 33 for an opening operation are provided on a front panel of the breaker main body 30. An overcurrent relay 34 for transmitting a trip signal when an overcurrent is generated is installed on one side of the breaker main body 30. Rollers 36 disposed on the rails 14 to be rollable are provided on both side surfaces of the breaker main body 30.

The breaker main body 30 can be mounted on the rails 14 of the cradle 10 and moved inward by the transfer unit. In this instance, positions or states of the air circuit breaker are divided, according to a relative position of the breaker main body 30 within the cradle 10, into three positions (states), namely, a disconnect position (state) (see FIG. 8) at which a control power source is completely disconnected, a test position (state) (see FIG. 9) at which the breaker main body 30 is moved rearward by a predetermined distance and thus the main body-side control terminal module 40 is connected to the cradle-side control terminal module 25 so as to check a connected state of the circuit breaker, and a connect position (state) (see FIG. 10) at which the breaker main body 30 is completely inserted into the cradle 10 and thus a main body terminal (not illustrated) is connected to the cradle terminal 11 such that a current can flow along a main circuit.

Referring to FIGS. 4 and 5, the cradle-side control terminal module 25 includes a plurality of cradle-side connectors 29, and a support plate 26 having a plurality of holes into which the cradle-side connectors 29 can be inserted.

The support plate 26 is provided with a perpendicular plate having the plurality of holes, an upper surface formed by bending an upper portion of the perpendicular plate, and support surfaces 27 formed by bending horizontally both lower end portions of the perpendicular plate. The cradle-side control terminal module 25 is slidably installed in a manner that the support surfaces 27 of the support plate 26 are inserted into the slits 12 formed at the side surfaces of the cradle 10. That is, the cradle-side control terminal module 25 is movable back and forth along the slits 12.

The main body-side control terminal module 40 includes a plurality of main body-side connectors 41 and a support base 42 on which the main body-side connectors 41 are installed. When the breaker main body 30 moves to the test position within the cradle 10, the main body-side connectors 41 are inserted into the cradle-side connectors 29 to be connected to the control circuit.

Referring to FIGS. 4 and 7, the latch 60 is rotatably mounted on the side surface of the cradle 10. The latch 60 may be formed of a '¬' shaped plate. The latch 60 is provided with a shaft hole 62 that allows the latch 60 to be inserted into a latch shaft 61 which is provided below the slit 12 formed through the side surface of the cradle 10. Of course, although not illustrated separately, according to embodiments, the latch shaft may be integrally formed with the latch 60 and the shaft hole may be formed through the side surface of the cradle 10.

A restricting portion 63 for restricting the movement of the cradle-side control terminal module 25 with being brought into contact with the cradle-side control terminal module 25 is provided on a top of a front end portion of the latch 60. The restricting portion 63 may be formed as a recess. Therefore, the restricting portion 63 comes into contact with the rear surface of the support surface 27 of the cradle-side control terminal module 25, thereby preventing the cradle-side control terminal module 25 from moving to a rear side.

A protruding portion 64 protrudes from a top of a rear end portion of the latch 60 to fix a lower end portion of the elastic member 70. The protruding portion 64 may protrude inwardly to be partially inserted into the spring hole 22 formed through the side surface of the cradle 10.

A contact portion 66 protruding inward in a cylindrical shape is provided on a lower end portion 65 of the latch 60 (a portion extending downward from one end of the latch 60). The contact portion 66 is inserted into the latch operation hole 24 of the cradle 10 so as to come in contact with the latch release plate 50 inside the side surface of the cradle 10, thereby rotating the latch 60.

Referring to FIGS. 4 and 6A, the latch release plate 50 is fixed to the side surface of the circuit breaker body 30. The latch release plate 50 includes a body portion 51 disposed at a predetermined distance from the side surface of the circuit breaker body 30, and coupling portions 52 formed at both ends of the body portion 51 in a bent manner and coupled to the side surface of the circuit breaker body 30.

A contact surface 54 is formed in a stepped shape on an upper surface of the body portion 51 of the latch release plate 50. The contact surface 54 includes a first flat portion 55 which is a surface with which the contact portion 66 is slidably brought into contact while the breaker body 30 moves from the disconnect position to the test position, a first inclined portion 56 which is a surface with which the contact portion 66 is brought into contact at the test position, and a second flat portion 57 which is a surface with which the contact portion 66 is slidably brought into contact while the breaker main body 30 moves from the test position to the connect position.

Referring to FIG. 6B, the latch release plate 50 may further include a second inclined portion 58 which is provided on the contact surface 54 of the previous embodiment (FIG. 6A) and with which the contact portion 66 is brought into contact at the test position. Also, a third flat portion 59 may be formed at a portion symmetrical to the first flat portion 55 based on the second flat portion 57. Here, the first inclined portion 56 and the second inclined portion 56 may be curved.

The latch release plate 50 may be formed symmetrically. That is, the first flat portion 55 may be formed at the same height as the third flat portion 59, and the first inclined portion 56 may be formed as an inclined surface that is symmetrical with the second inclined portion 58. This is for the latches 60 to be shared and used when the latches 60 are installed on both side surfaces of the breaker main body 30.

Figure 11:
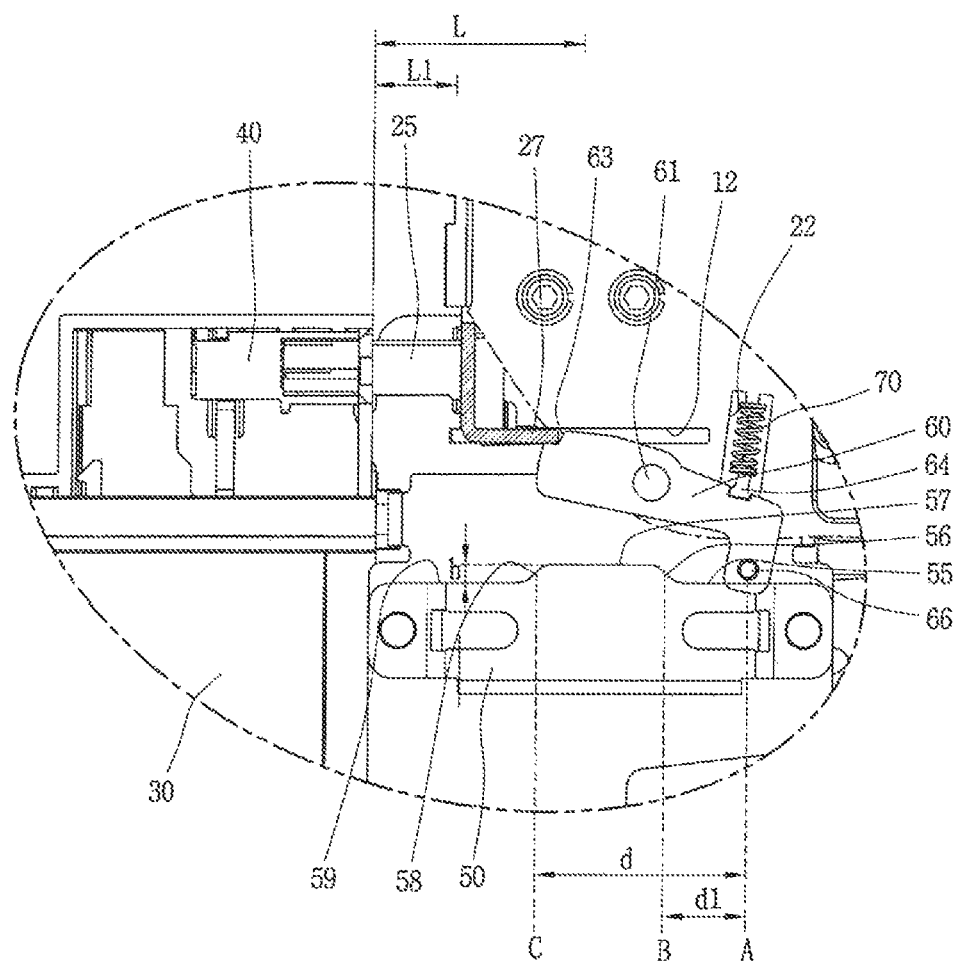
FIG. 11 is an explanatory view of an operation of a connecting device for control terminals in a withdrawable circuit breaker in accordance with another embodiment of the present invention.

Referring to FIG. 11, the second flat portion 57 is formed higher than the first flat portion 55 by a predetermined height. Here, the height difference between the first flat portion 55 and the second flat portion 57 is referred to as 'h'. h should be greater than the height of the restricting portion 63.

It is assumed that a portion where the contact portion 66 comes in contact with the contact surface 54 at the disconnect position is referred to as 'A,' a portion where the contact portion 66 comes in contact with the contact surface 54 at the test position is referred to as 'B' and a portion where the contact portion 66 comes in contact with the contact surface 54 at the connect position is referred to as 'C.' A located on the first flat portion 55, B is on the first inclined portion 56, and C is on the second inclined portion 58. In this instance, if it is assumed that a distance between A and B ('A-B') is d1 and a distance of 'A-C' is d, d1 corresponds to a moving distance between the disconnect position and the test position, and d corresponds to a moving distance between the disconnect position and the connect position. The moving distance of the breaker main body 30 is shown based on (from) the rear end portion of the cover at the upper portion of the main body-side control terminal module 40 of the breaker main body 30. Namely, if L1 denotes a distance moved from the disconnect position to the test position and L denotes a distance moved from the disconnect position to the connect position, L=d and L1=d1.

According to an embodiment, the latch release plate 50 may be integrally formed with a transport handle of the breaker main body 30. As a result, additional objects can be achieved without increasing the number of components.

The elastic member 70 is provided to buffer the movement of the latch 60 to smoothly move the latch 60 and assist the latch 60 to return to its original position when the latch 60 is pulled out. An upper end portion of the elastic member 70 is fixed to the fixing protrusion 23 of the spring hole 22 and a lower end portion of the elastic member 70 is fixed to the protruding portion 64 of the latch 60. The elastic member 70 may be configured as a compression spring or a tension spring. In this embodiment, the elastic member 70 is configured as a compression coil spring. Since the latch 60 receives force applied downward by the elastic member 70, the latch 60 can be slid in place on the flat portion and smoothly rotate along the inclined surface on the inclined portion during the movement of the latch release plate 50, whereas fast returning to its original position during the return.

Hereinafter, an operation of the connecting device for the control terminals in the withdrawable type circuit breaker according to the embodiment of the present invention will be described with reference to FIGS. 8 to 11.

FIG. 8 illustrates that the breaker main body 30 is inserted into the cradle 10 and is located at the disconnect position. In this instance, the restricting portion 63 of the latch 60 fixes the support surface 27 of the cradle-side control terminal module 25 to restrict the movement of the cradle-side control terminal module 25. The main body-side control terminal module 40 is in contact with the cradle-side control terminal module 25. The contact portion 66 of the latch 60 is also located at a point A (see FIG. 11) of the first flat portion 55 of the latch release plate 50. Here, the cam follower 35 of the breaker main body 30 is hooked to an entrance of the cam slot 21. When the user rotates the screw shaft 15 in an inserting direction by a manual handle or a gearing, the rotational force causes the cam 20 to rotate counterclockwise through the respective components of the transfer unit, and accordingly the cam follower 35 is pulled by the cam slot 21 such that the breaker main body 30 moves rearward.

As the breaker body 30 moves, the latch release plate 50 also moves together and the contact portion 66 executes a sliding or curving motion along the contact surface 54.

First, when the breaker main body 30 is moved from the disconnect position to the test position (FIG. 8→FIG. 9), the contact portion 66 is slid on the first flat portion 55 of the contact surface 54 and brought into contact with the first inclined portion 56. During this process, since the cradle-side control terminal module 25 is in a stopped state with being restricted by the latch 60, the main body-side control terminal module 40 is inserted into the cradle-side control terminal module 25 and connected to the control circuit.

FIG. 9 illustrates a state in which the breaker main body 30 is placed at the test position. The contact portion 66 is placed at a point B of the contact surface 54 (see FIG. 11) and the main body-side control terminal module 40 is in a state of being coupled to the cradle-side control terminal module 25.

When the user further rotates the screw shaft 15 at the test position, the breaker main body 30 moves rearward beyond the test position. The contact portion 66 passes the first inclined portion 56 to arrive at the second flat portion 57, and the latch 60 rotates counterclockwise centering on the latch shaft 61 to release the locked (restricted) restricting portion 63. Accordingly, the control terminal modules 25 and 40 can move rearward together with the breaker main body 30. In this instance, since the latch 60 is subjected to the force applied by the elastic member 70, the rotational motion is performed not suddenly but smoothly. (The rotational motion of the latch 60 may be completed at the test position as illustrated in FIG. 9. That is, the rotational motion of the latch 60 may be executed between before and after approaching the test position.)

FIG. 10 illustrates a state in which the breaker main body 30 is located at the connect position. The contact portion 66 is placed at a point C of the contact surface 54 (see FIG. 11), and the support surface 27 of the cradle-side control terminal module 25 moves to a rear portion of the slit 21 by passing the upper surface of the latch 60 by a predetermined distance.

The connecting device for the control terminals in the withdrawable type circuit breaker according to the embodiment of the present invention operates according to the relative positions of the breaker main body 30 and the cradle 10 without cooperation with the transfer unit. Therefore, it can obtain stability and accuracy of the operation. Further, the components thereof can be simplified.

When withdrawing the breaker main body 30, it operates in the opposite direction to that at the time of insertion. When the user rotates the screw shaft 15 in a withdrawing direction, the rotational force causes the cam 20 to rotate clockwise through the respective components of the transfer unit, and accordingly the cam slot 21 pushes the cam follower 35 so that the breaker main body 30 is moved forward.

First, at the connect position of FIG. 10, the contact portion 66 is located at a point C of the contact surface 54 and the main body-side control terminal module 40 is connected to the cradle-side control terminal module 25. When the breaker main body 30 is pulled out and moved to the test position, the contact portion 66 is slid along the second flat portion 57. In this instance, the control terminal modules 25 and 40 are moved forward together with the breaker main body 30.

When reaching the test position as illustrated in FIG. 9, the contact portion 66 is placed at the point B of the contact surface 54, and the restricting portion 63 is brought into contact with the rear end of the support surface 27.

When the breaker main body 30 is further pulled out, the support surface 27 is inserted into the restricting portion 63 of the latch 60, and the cradle-side control terminal module 25 is in a stopped state by being blocked at the front end portion of the slit 12. Accordingly, since the cradle-side control terminal module 25 is fixed, the main body-side control terminal module 40 is separated from the cradle-side control terminal module 25.

When the breaker main body 30 reaches the disconnect position as illustrated in FIG. 8, the main body-side control terminal module 40 is completely separated from the cradle-side control terminal module 25, and the contact portion 66 is placed at the point A of the contact surface 54.

Figure 12:
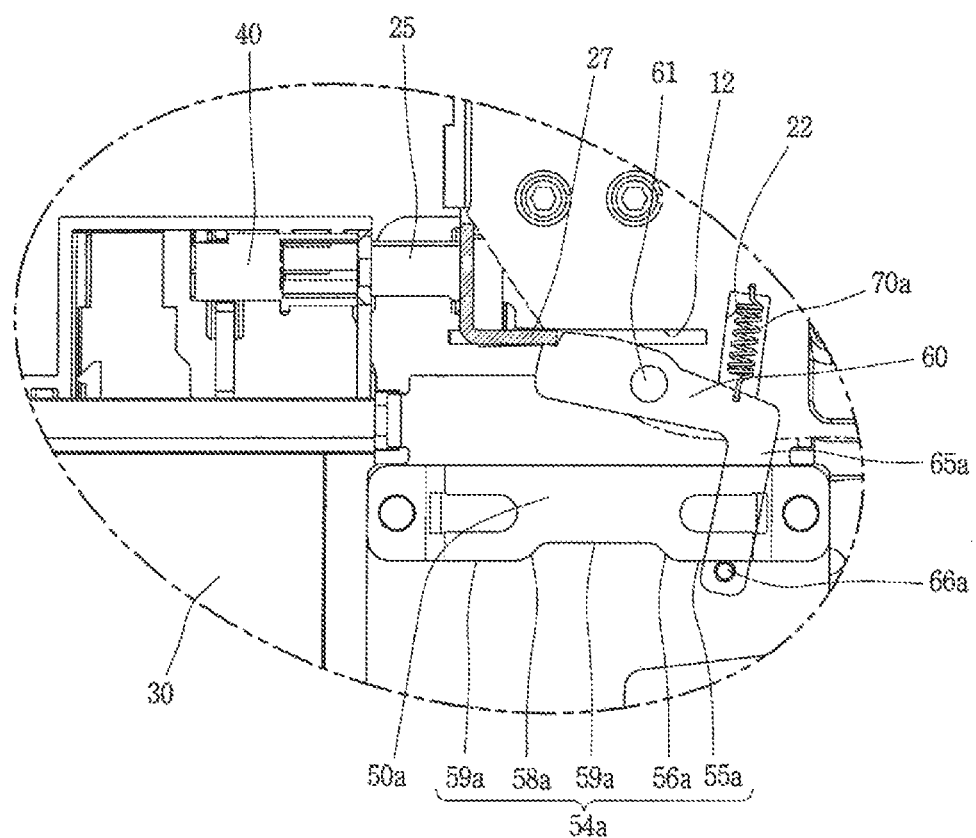
FIG. 12 is a partial side view of a connecting device for control terminals in a withdrawable circuit breaker in accordance with another embodiment of the present invention

FIG. 12 is a partial side view of a connecting device for control terminals in a withdrawable type circuit breaker according to another embodiment of the present invention.

In this embodiment, a contact surface 54*a* is formed on a lower surface of a latch release plate 50*a*. A latch 60*a* has a lower end portion 65*a* which extends from one end thereof in a bent manner. The lower end portion 65*a* extends longer than a lower end portion of the latch in the previous embodiment. A contact portion 66*a* of the latch 60*a* contacts a contact surface 54*a* at a lower portion of the contact surface 54*a*. An elastic member 70*a* may be configured as a tension spring. In addition, the latch 60*a* is provided with a hole for fixing one end of the tension spring, other than the protruding portion as in the previous embodiment. That is, the elastic member 70*a* can be fixed to holes formed in the cradle 10 and a part of the latch 60*a*, respectively.

Since the operation in this embodiment is similar to that in the previous embodiment, only the difference will be described. One end of the latch 60*a* receives force directed upward by the elastic member 70 and thus the latch 60*a* receives force to rotate counterclockwise. Therefore, while the breaker main body 30 passes the test position, the contact portion 66*a* passes along the first inclined portion 56*a*, and the latch 60*a* thus receives force from the elastic member 70*a* which is restored upward. Accordingly, the latch 60*a* rotates counterclockwise.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A connecting device for control terminals in a withdrawable type circuit breaker, the device comprising:
   a cradle-side control terminal module horizontally installed on a cradle to move slidably thereon;
   a main body-side control terminal module provided on a breaker main body to be contactable with or separated from the cradle-side control terminal module; and
   a blocking unit restricting or allowing a movement of the cradle-side control terminal module to allow or restrict a contact between the cradle-side control terminal module and the main body-side control terminal module, wherein the blocking unit comprises
      a latch release plate fixed to a side surface of the breaker main body and provided with a contact surface on one surface thereof, the contact surface having a flat portion and an inclined portion; and
      a latch rotatably disposed on a side surface of the cradle and moving along the contact surface,
      wherein the latch comprises a restricting portion formed on one end thereof and brought into contact with the cradle-side control terminal module to restrict the movement of the cradle-side control terminal module, and a contact portion formed on another end thereof and moving along an upper surface of the contact surface.

2. The device of claim 1, wherein the contact portion is formed as a protrusion in a cylindrical shape, and the cradle is provided with a latch operation hole in which the contact portion is inserted for movement.

3. The device of claim 1, wherein the contact surface comprises a first flat portion with which the contact portion is brought into contact while the breaker main body moves from a disconnect state to a test state, a first inclined portion with which the contact portion is brought into contact in the test state, and a second flat portion with which the contact portion is brought into contact while the breaker main body moves from the test state to a connect state.

4. The device of claim 3, further comprising a second inclined portion with which the contact portion is brought into contact in the connect state, and a third flat portion formed on a portion symmetrical to the first flat portion based on the second flat portion.

5. The device of claim 3, wherein the first flat portion and the second flat portion are formed at different height from each other.

6. The device of claim 1, wherein the latch release plate comprises a body portion installed at a predetermined distance from a side surface of the breaker main body and having the contact surface on one surface thereof, and coupling portions bent from both ends of the body portion and coupled to the side surface of the breaker main body.

7. The device of claim 1, wherein the latch release plate is configured for use as a transport handle of the breaker main body.

8. The device of claim 1, further comprising an elastic member having one end fixed to one side of the latch and another end fixed to a part of the cradle.

9. The device of claim 8, wherein the elastic member is a compression spring or a tension spring.

* * * * *